(12) United States Patent
Delfino et al.

(10) Patent No.: US 11,235,616 B2
(45) Date of Patent: Feb. 1, 2022

(54) METHOD OF MOUNTING A NON-PNEUMATIC TIRE ONTO A HUB

(71) Applicant: COMPAGNIE GENERALE DES ETABLISSEMENTS MICHELIN, Clermont-Ferrand (FR)

(72) Inventors: Antonio Delfino, Givisiez (CH); Philippe Berguerand, Givisiez (CH); Pascal Schroeter, Givisiez (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 166 days.

(21) Appl. No.: 16/472,687

(22) PCT Filed: Dec. 22, 2016

(86) PCT No.: PCT/IB2016/057948
§ 371 (c)(1),
(2) Date: Jun. 21, 2019

(87) PCT Pub. No.: WO2018/115939
PCT Pub. Date: Jun. 28, 2018

(65) Prior Publication Data
US 2019/0366767 A1 Dec. 5, 2019

(51) Int. Cl.
*B60B 31/00* (2006.01)
*B60B 9/04* (2006.01)
(Continued)

(52) U.S. Cl.
CPC .............. *B60B 31/005* (2013.01); *B60B 9/04* (2013.01); *B60B 9/18* (2013.01); *B60C 7/14* (2013.01);
(Continued)

(58) Field of Classification Search
CPC ........... B60B 1/042; B60B 21/06; B60B 9/26; B60C 7/10; B60C 7/18; Y10T 29/49515; Y10T 29/49517; Y10T 29/49519
See application file for complete search history.

(56) References Cited

U.S. PATENT DOCUMENTS

| 1,336,031 A * | 4/1920 | Gebhardt | B60B 9/26 |
| | | | 152/85 |
| RE14,900 E * | 6/1920 | Black | 152/31 |

(Continued)

FOREIGN PATENT DOCUMENTS

| GB | 12636 | 11/1911 |
| JP | 2012077974 | 1/2012 |

(Continued)

OTHER PUBLICATIONS

International Search Report dated Sep. 7, 2017 for International Application No. PCT/IB2016/057948.
(Continued)

*Primary Examiner* — Sarang Afzali
(74) *Attorney, Agent, or Firm* — Dority & Manning, P.A.

(57) ABSTRACT

A method of mounting a non-pneumatic tire onto a hub to provide a non-pneumatic wheel is provided. Certain portions of spokes of the non-pneumatic tire are connected to grooves along the hub. The tire is repeatedly rotated and deformed to allow the remaining portions of the spokes to be connected with the grooves in order to fully mount the tire onto the hub.

15 Claims, 11 Drawing Sheets

(51) Int. Cl.
  *B60B 9/18* (2006.01)
  *B60C 7/14* (2006.01)
(52) U.S. Cl.
  CPC ..... *B60B 2310/30* (2013.01); *B60B 2900/313* (2013.01); *B60B 2900/50* (2013.01); *B60C 7/146* (2021.08); *Y10T 29/49515* (2015.01)

(56) References Cited

U.S. PATENT DOCUMENTS

| | | | | |
|---|---|---|---|---|
| 1,451,827 | A * | 4/1923 | Hobson | B60B 9/26 |
| | | | | 152/75 |
| 2,013,895 | A * | 9/1935 | Pannecoucke | B21D 53/268 |
| | | | | 29/894.34 |
| 3,493,027 | A * | 2/1970 | Dewhirst | B60C 7/14 |
| | | | | 152/11 |
| 4,538,332 | A * | 9/1985 | Carminati | B60B 27/023 |
| | | | | 29/429 |
| 6,286,572 | B1 | 9/2001 | Chen | |
| 8,714,217 | B2 * | 5/2014 | Chon | B60B 9/02 |
| | | | | 152/74 |
| 9,180,732 | B2 | 11/2015 | Endicott | |
| 10,308,065 | B2 * | 6/2019 | Biderman | A61B 5/222 |
| 2007/0267116 | A1 | 11/2007 | Rhyne et al. | |
| 2009/0211675 | A1 | 8/2009 | Louden | |
| 2011/0126948 | A1 | 6/2011 | Boyer et al. | |
| 2016/0016426 | A1 | 1/2016 | Endicott | |
| 2018/0037054 | A1 | 2/2018 | Cron et al. | |
| 2019/0001598 | A1 * | 1/2019 | Delfino | B60B 1/042 |

FOREIGN PATENT DOCUMENTS

| | | |
|---|---|---|
| WO | WO 2011/025491 | 3/2011 |
| WO | WO 2016/109702 | 7/2016 |

OTHER PUBLICATIONS

International Search Report dated Aug. 29, 2017 for International Application No. PCT/IB2016/057953.

International Search Report dated Sep. 8, 2017 for International Application No. PCT/IB2016/057950.

* cited by examiner

METHOD OF MOUNTING A NON-PNEUMATIC TIRE ONTO A HUB

PRIORITY STATEMENT

The present application is a subsequent Application of and claims priority to PCT/IB2016/057948, filed Dec. 22, 2016, which is incorporated herein by reference for all purposes.

FIELD OF THE INVENTION

The subject matter of the present disclosure relates generally to a method of mounting a non-pneumatic tire onto a hub to provide a non-pneumatic wheel.

BACKGROUND OF THE INVENTION

Non-pneumatic wheel constructions and their benefits are described in e.g., U.S. Pat. Nos. 6,769,465; 6,994,134; 7,013,939; and 7,201.194, which are incorporated herein by reference in their entirety for all purposes. Some non-pneumatic tire constructions propose incorporating an annular band, sometimes referred to as e.g., a shear band, annular shear band, a band with a shear layer, or a compliant band. Embodiments of such are described in e.g., U.S. Pat. Nos. 6,769,465 and 7,201,194. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (i.e. spokes) extending radially outward from a center element or hub. As such non-pneumatic wheel rolls over the ground surface, the tension-transmitting elements opposite the ground contacting portion of the wheel support the hub in tension. Specifically, the hub is suspended from the top of the wheel by the spokes instead of being primarily supported by compression of such elements located between the hub and the ground surface as is typical of e.g., solid wheel constructions where a hub is encircled by solid rubber or layers of rubber.

For certain constructions, such non-pneumatic wheel may be formed by open cast molding in which a polymeric material such as e.g., polyurethane is poured into a mold that forms all or part of the non-pneumatic tire. One or more inextensible reinforcement structures such as cords may be molded in place in the compliant band. Typically, in such prior constructions, the spokes and the hub are molded as an integral, single-piece construction. Alternatively, the spokes may be integrally joined by a band that is then joined with a hub or wheel center. In either construction, the spokes are not readily removable from either the radially-outer end attached with the compliant band or the radially-inner end attached to the hub or wheel center.

The construction and configuration of the spokes can affect the performance of the non-pneumatic wheel. Spokes constructed from different sizes, configurations, and materials of construction can affect the way tension is transmitted between the wheel hub and the compliant band, leading to differences in load carrying capabilities of the non-pneumatic wheel and perceived handling characteristics. The density of the spokes can also determine e.g., how much tension each spoke carries as it rotates to the top of the wheel during operation.

Because of e.g., the integral construction, prior non-pneumatic wheel constructions are not readily amenable to substituting different spokes into the non-pneumatic wheel, substituting differed hubs into the non-pneumatic wheel, or both. Such a substitution would require e.g., destructive steps to cut or extricate the spoke from the annular band of the non-pneumatic wheel. Additionally, because the spokes are joined or attached with the wheel hub, the substitution of different wheels hubs of different materials or configuration is not readily feasible for the same reason. Finally, prior manufacturing methods have not been conducive to incorporating reinforcements, shapes, layers of material, and other features into the construction of the spoke.

Accordingly, a non-pneumatic wheel having spokes that can be removably attached to the hub, the annular shear band, or both, would be helpful. In addition, a method of manufacturing such a non-pneumatic wheel, and particularly to installing such spokes into the non-pneumatic wheel, would be very useful.

SUMMARY OF THE INVENTION

The present invention provides an exemplary method of mounting a non-pneumatic tire onto a hub to provide a non-pneumatic wheel. Certain portions of spokes of the non-pneumatic tire are connected to grooves along the hub. The tire is repeatedly rotated and deformed to allow the remaining portions of the spokes to be connected with the grooves in order to fully mount the tire onto the hub. Additional aspects and advantages of the invention will be set forth in part in the following description, or may be obvious from the description, or may be learned through practice of the invention.

In one exemplary aspect, the present invention provides a method for mounting a non-pneumatic tire onto a hub. This exemplary non-pneumatic tire defines axial, radial, and circumferential directions. The non-pneumatic tire has an annular shear band and a plurality of spokes. Each spoke has a central spoke portion positioned along the axial direction between a pair of corresponding outer spoke portions. Each central spoke portion has a radially-outer end connected with the annular band. Each outer spoke portion has a radially-outer end connected with the annular band. Each central spoke portion has a radially-inner end. Each outer spoke portion has a radially-inner end. The hub has a plurality of grooves that are spaced apart along the circumferential direction. Each groove has a longitudinal axis extending along the axial direction.

The exemplary method for mounting such a non-pneumatic tire includes placing the hub into a central opening defined by the non-pneumatic tire; inserting the radially-inner ends of the central spoke portions into the grooves of the hub with one central spoke portion per groove; deforming the annular band radially inward towards the hub so as to decrease a distance along the radial direction between the annular band and the hub; sliding the radially-inner ends of the corresponding outer spoke portions of at least one central spoke portion into one of the grooves circumferentially adjacent to the groove containing the radially-inner end of the at least one central spoke portion; undeforming the annular band so as to increase the distance along the radial direction between the annular band and the hub; rotating the tire and hub a predetermined amount; and repeating the deforming, sliding, undeforming, and rotating until all of the outer spoke portions are connected to the hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF THE INVENTION

For purposes of describing the invention, reference now will be made in detail to embodiments and aspects of the invention, one or more examples of which are illustrated in the drawings. Each example is provided by way of explanation of the invention, not limitation of the invention. In fact, from the teachings disclosed herein, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply.

Axial direction A refers to a direction parallel to an axis about which a referenced exemplary wheel or tire rotates during use.

Radial direction R refers to a direction perpendicular to axial direction A with radially-outer or radially outward referring to a general direction away from axial direction A, and radially-inner or radially inward referring to a general direction towards axial direction A.

Circumferential direction C refers to a direction defined by defined by the circumference of the wheel or tire, or the direction of rotation the wheel or tire about an axis.

Figure 1:
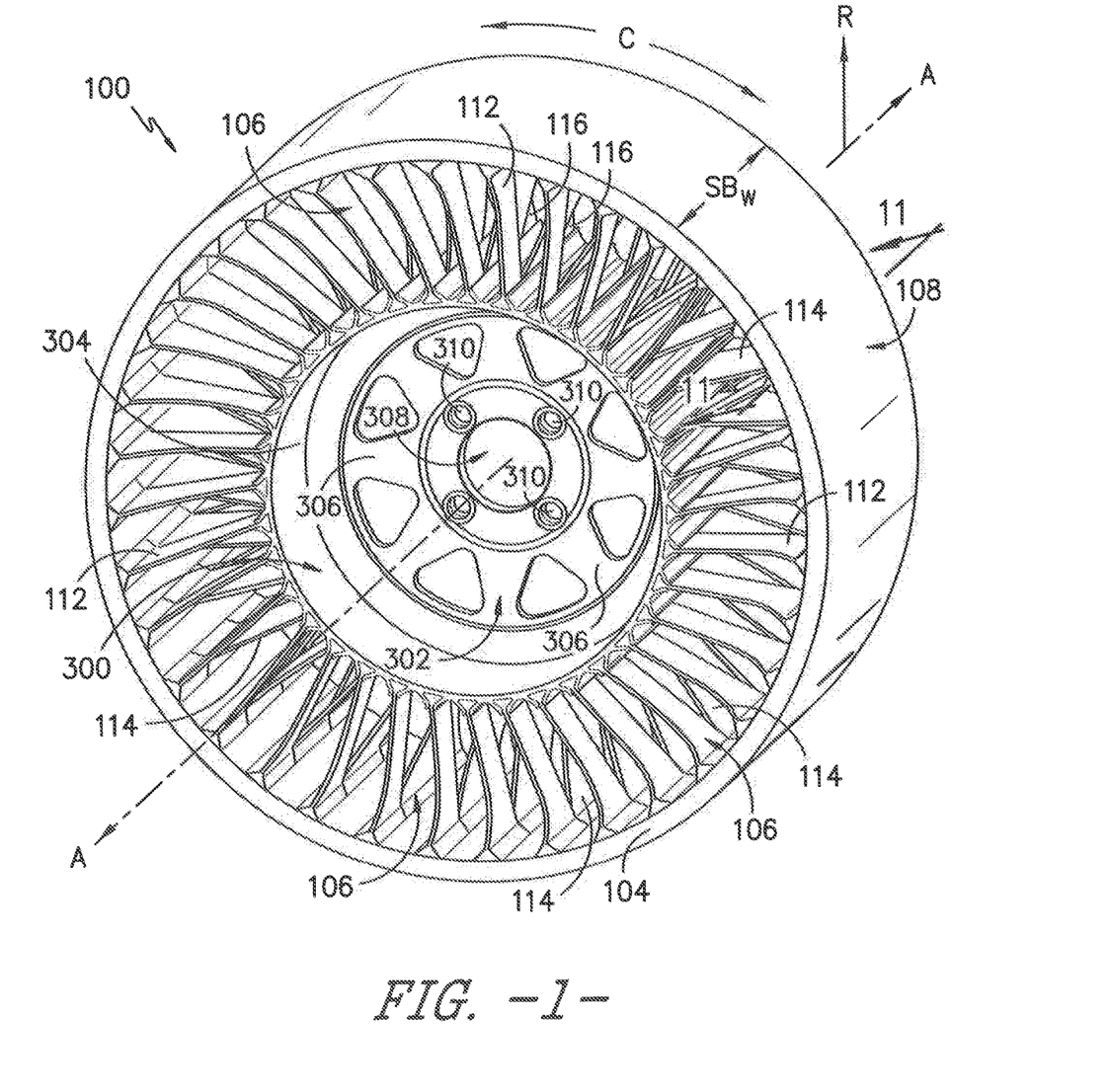
FIG. 1 illustrates a perspective view of an exemplary embodiment of a non-pneumatic wheel of the present invention.
Figure 2:
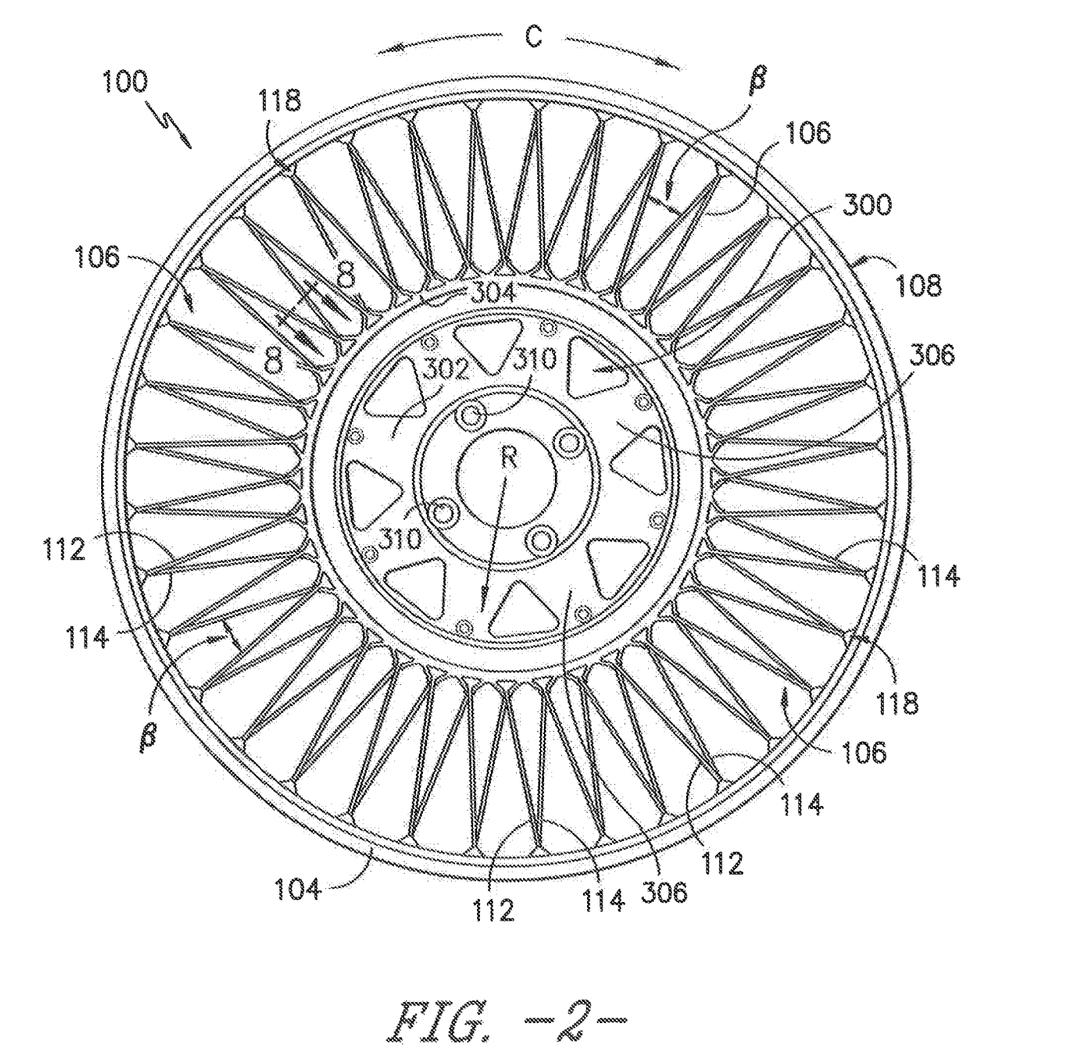
FIG. 2 illustrates a side view of the exemplary embodiment of FIG. 1.
Figure 3:
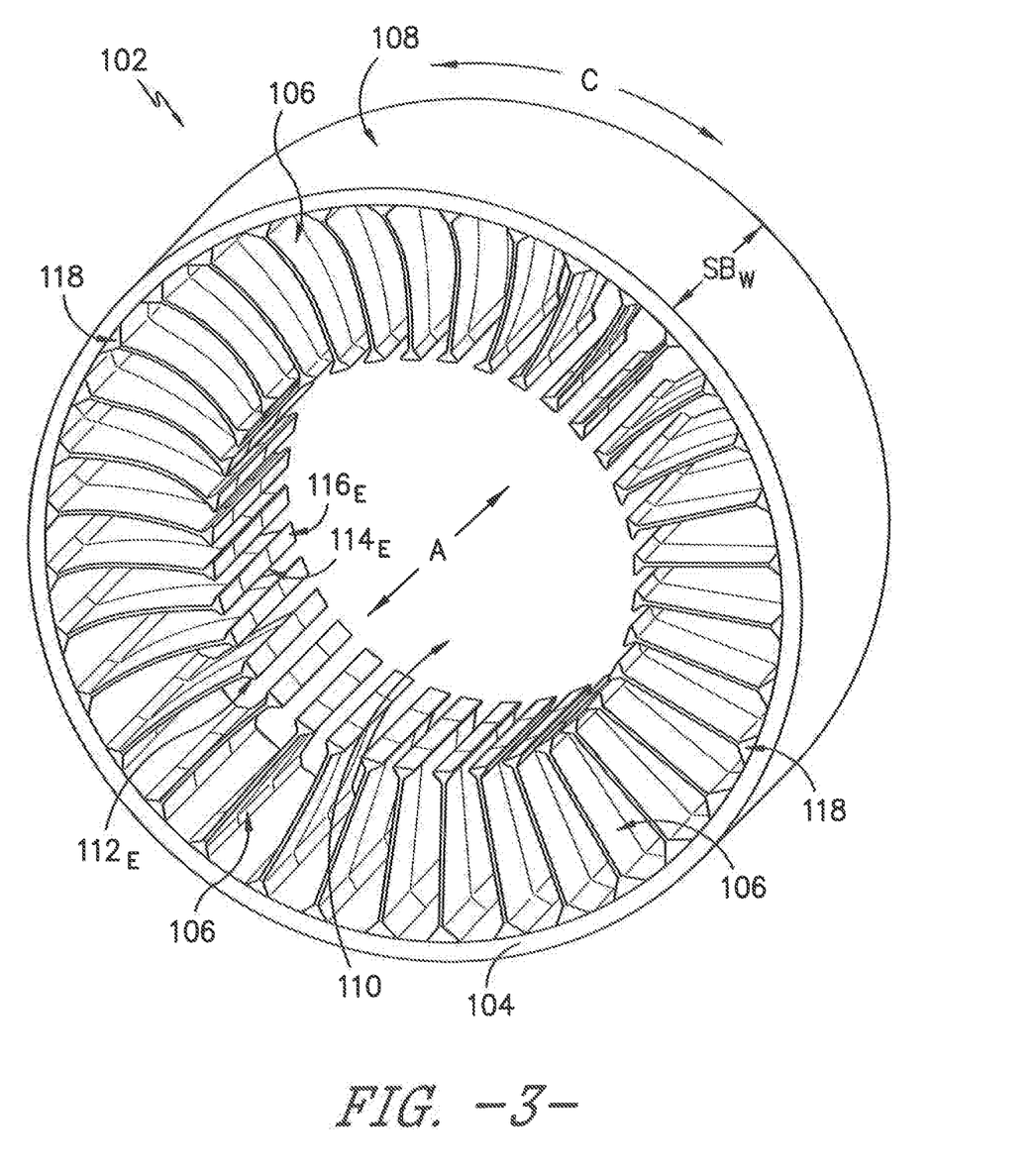
FIG. 3 is a perspective view of an exemplary tire of the present invention as may be used in the exemplary wheel of FIG. 1.
Figure 4:
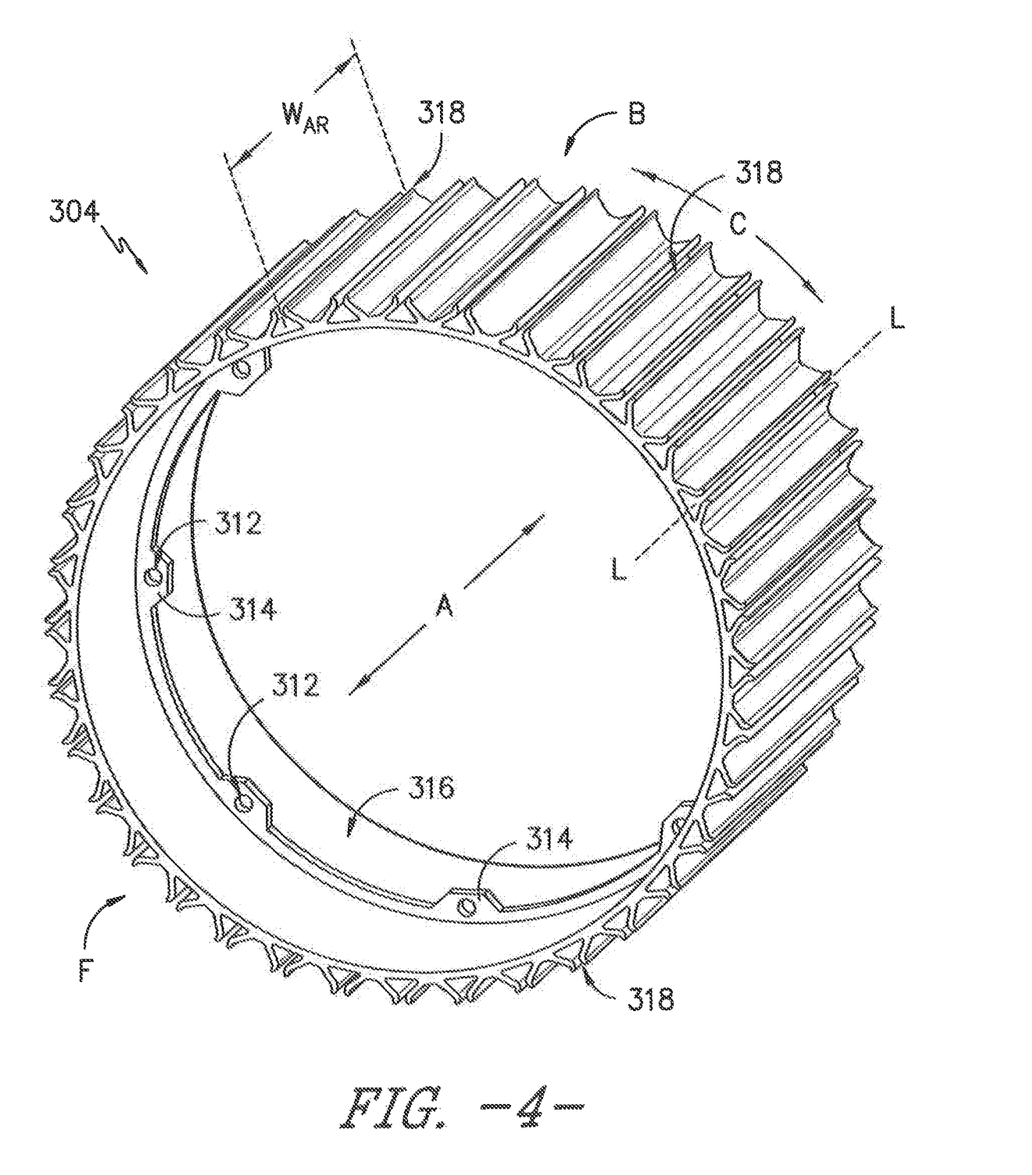
FIG. 4 is a perspective view of an exemplary, annular receiver of the present invention.

FIGS. 1 and 2 illustrate an exemplary embodiment of a non-pneumatic wheel 100 of the present invention. Wheel 100 includes a non-pneumatic tire 102 supported on a hub 300, which includes an annular receiver 304 that may be connected with a central portion 302. FIG. 3 depicts non-pneumatic tire 102 without hub 300. FIG. 4 depicts annular receiver 304 of hub 300 with central portion 302 in place.

Referring now to FIGS. 1, 2, and 3, non-pneumatic tire 102 includes an annular shear band 104 that extends circumferentially around wheel 100 and has an axial width $SB_W$. Tire 102 includes a plurality of spokes 106 that are connected with shear band 102, connected with annular receiver 304 of hub 300, and spaced apart along circumferential direction C as will be further described. An exemplary method of connecting spokes 106 with annular receiver 304 is also described herein.

Central portion 302 of hub 300 is configured for supporting wheel 100 on a vehicle. In this exemplary embodiment, hub 300 includes a plurality of spokes or arms 306 extending radially outward from a centroid 308 (FIG. 1), or from the axis of rotation of hub 300, to annular receiver 304. A plurality of openings 310 allow for insertion of fasteners to secure hub 300 (and thereby non-pneumatic wheel 100) to a vehicle. Hub 300 may be e.g., welded to annular receiver 304 or, in an alternative, formed integrally therewith. In still another embodiment, central portion 302 may be secured using fasteners extending through openings 312 in tabs 314 spaced apart along radially-inner surface of annular receiver 304 as depicted in FIG. 4. The appearance and features of hub 300, and particularly central portion 302, are provided by way of example only and other configurations may be used as well.

Annular shear band 104 may include one or more reinforcing bands, reinforcing plies, shear layers, and other components (not shown). For example, shear band 104 may be constructed with a radially-inner reinforcing band, a radially-outer reinforcing band, and a shear layer positioned therebetween. The shear layer may be constructed e.g. of an elastomeric material such as e.g., natural and synthetic rubbers, polyurethanes, foamed rubbers and polyurethanes, segmented copolyesters, and block co-polymers of nylon. The reinforcing bands may include reinforcements constructed from e.g., essentially inextensible cord reinforcements embedded in an elastomeric coating. Such reinforcements may include e.g., any of several materials suitable for use as tire belt reinforcements in conventional tires such as cords of steel, composites of glass and resin such as e.g., fiberglass reinforced plastics, and other materials having a high modulus in tension and compression. In still another example, shear band 104 includes reinforcing plies, with each ply including cables that extend substantially along the circumferential direction C and may also be wrapped about axial direction A.

Shear band 104 provides a stiffness that allows spokes 106 to support hub 300 in tension during use of wheel 100 on a vehicle. As wheel 100 rolls across the surface of the ground, hub 300 "hangs" from shear band 104 through a portion of the plurality of spokes 106 that are in tension near the top of wheel 100 opposite the ground contacting portion of shear band 104. The portion of spokes 106 in tension changes as wheel 100 rolls and different spokes move into position opposite the ground contacting portion of shear band 104. At the same time, shear band 104 provides a resiliency or compliance over the ground surface that provides for a smoother, more comfortable ride.

Shear band 102 is depicted in FIGS. 1, 2, and 3, as having a smooth, radially-outer surface 108. However, outer surface 108 may be provided with a tread having e.g., grooves, ribs, blocks, or other features for enhancing traction performance. The tread can be molded directly into outer surface 108 or may be provided as a tread portion wrapped around wheel 100 and attached thereto. Other configurations may be used as well.

Figure 5:
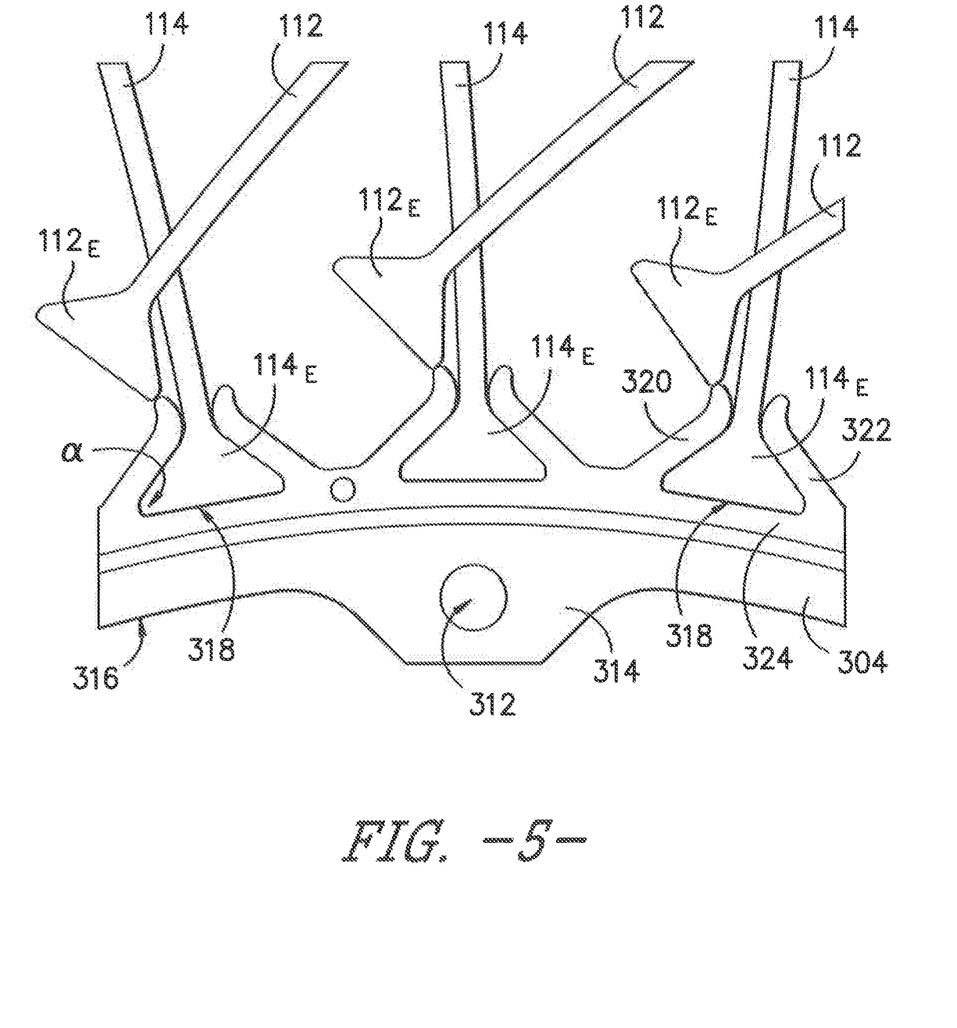
FIG. 5 is a close-up, side view of a portion of the exemplary annular receiver of FIG. 4 along with the radially-inner ends of central and outer spoke portions during an intermediate step in assembling the non-pneumatic wheel of FIG. 1.

Referring now to FIGS. 4 and 5, annular receiver 304 includes a plurality of grooves 318 spaced apart from each other along circumferential direction C. Each groove 318 defines a longitudinal axis L extending parallel to axial direction A. For this embodiment, each groove 318 is formed by a pair of fingers 320, 322 and base 324 that give groove 318 a triangular shape when viewed along axial direction A as shown in FIG. 5. Each finger 320 and 322 forms an acute angle α with base 324 in the range of 30 degrees≤α≤60 degrees for this exemplary embodiment. As such, grooves 318 have a triangular cross-sectional shape configured for complementary receipt of radially-inner ends (such as $114_E$) of spoke 106. Other cross-sectional shapes may be used as well. For this exemplary embodiment, grooves 318 and fingers 320, 322 each maintain a constant profile along the axial width $W_{AR}$ (FIG. 4) of annular receiver 304.

Figures 6, 7:
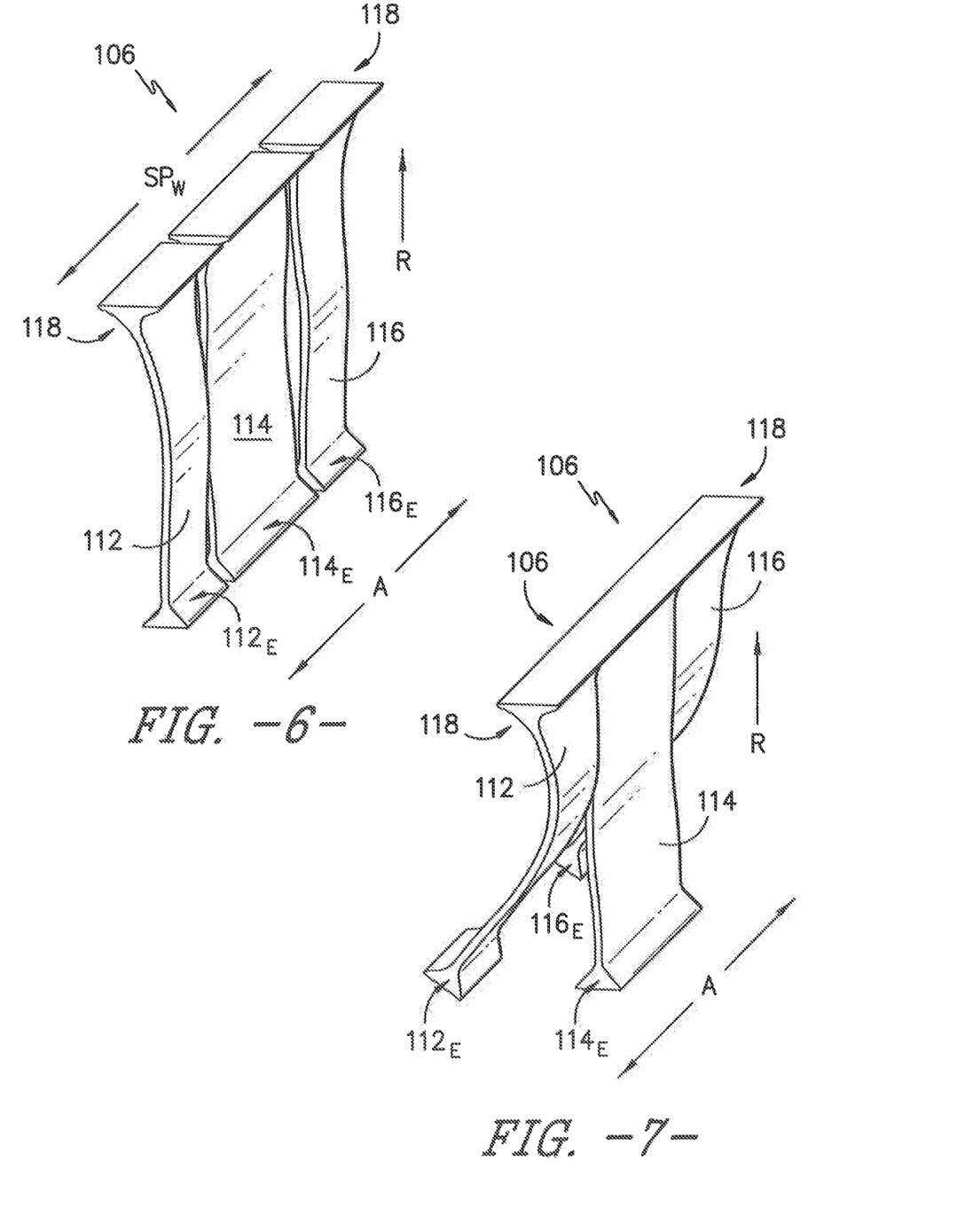
FIGS. 6 and 7 are perspective views of exemplary spokes (or tension-transmitting elements) of the present invention.

As shown in FIGS. 1, 2, 6, and 7, each spoke 106 includes a radially-outer end 118 that is connected with annular shear band 104. Radially-outer end 118 may be attached directly to shear band 104 or indirectly through a ring or feature connected to shear band 104. Spoke 106 may be one continuous piece along radially-outer end 118 as shown in FIG. 7 or may be separated into three portions as shown in FIG. 6.

In one exemplary embodiment, each spoke 106 may include a plurality of reinforcement elements (not shown) provided as inextensible cords extending adjacent and parallel to each other along radial direction R or at other angles to radial direction R. For one exemplary embodiment, as used herein, "inextensible" means the material has an elongation at break of 12 percent or less as measured at 23'C according to ASTM 885. By way of example, such inextensible cords may be constructed from nylon, steel, combinations thereof, and other materials as well. Such cord may be positioned across the entire axial width $SP_W$ (FIG. 6) of spoke 106 or, alternatively, may be positioned across only a portion of width $SP_W$. Such cords may be encased or embedded within one or layers of e.g., polymeric materials such as rubber forming spoke 106. Additional examples of spokes as may be used with the present invention are described in e.g. PCT International Application No. PCT/IB2015/058420, commonly owned by the assignees of the present invention, and incorporated here in its entirety by reference for all purposes.

Referring to FIGS. 6 and 7, for this exemplary embodiment each spoke 106 has a central spoke portion 114 positioned along axial direction A between its pair of corresponding outer spoke portions 112 and 116, with are opposed to each other along axial direction A. Each spoke portion 112, 114, and 116 has a respective radially-inner end $112_E$, $114_E$, and 116E configured for complementary receipt into grooves 318 of annular receiver 304. Furthermore, radially-inner ends $112_E$, $114_E$, and $116_E$ are discrete or separate and may be moved independently of each other. Thus, as shown by way of example in FIG. 7, central portion 114 is shown extending along radial direction R while its associated or corresponding outer portions 112 and 116 may be folded or bent away from radial direction R.

Figure 8:
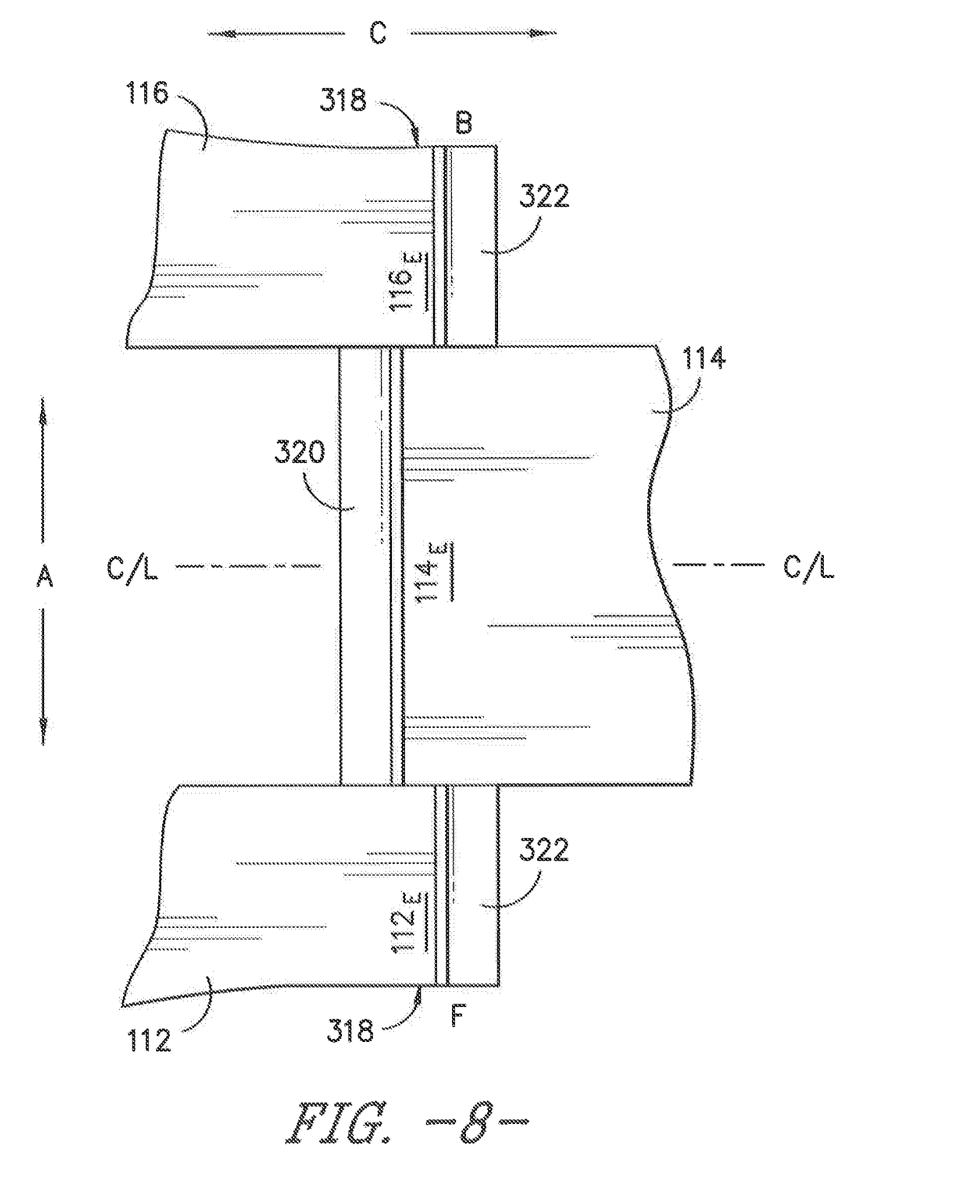
FIG. 8 is a view of an exemplary groove of the present invention as viewed along a radially inward direction depicted by lines 8-8 in FIG. 2.

Referring back to FIGS. 1 and 2, which depicts tire 102 assembled with hub 300, the central portion 114 of each spoke 106 is not connected into the same groove 318 as its corresponding outer portions 112 and 116. Instead, for each spoke 106, radially-inner end $114_E$ is positioned within a first groove 318 while radially-inner ends $112_E$ and $116_E$ of the same spoke 106 are positioned within a second groove 318 that is circumferentially adjacent to first groove 318 along annular receiver 104. For example, as shown in FIG. 8, moving along the axial direction of a particular groove 318 from front F to back B of annular receiver 304, such groove 318 receives radially-inner ends $112_E$ and $116_E$ of a first spoke 106 and the radially-inner end $114_E$ of a second spoke 106 that is circumferentially adjacent to first spoke 106 along tire 102. As such, as shown in FIG. 2, central spoke portions 114 form an angle 3 with outer spoke portions 112 and 116 when wheel 100 is assembled. For this exemplary embodiment, angle β is in the range of 5 degrees≤β≤15 degrees or, in still another embodiment, angle β is 10 degrees.

An exemplary method of mounting tire 102 onto hub 300 will now be described. Using the teachings disclosed herein, one of skill in the art will understand that the exemplary method may be used with other exemplary wheels, tires and/or apparatuses of the invention as well to provide additional exemplary methods. As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously.

According to this exemplary method, hub 300 (or at least annular receiver 304) is placed into a central opening 110 provided by tire 102 (FIG. 3). As shown, central opening 110 is surrounded by annular shear band 104 and spokes 106. As hub 300 is placed into opening 110, radially-inner ends $114_E$ of all central spoke portions 114 are inserted into grooves 318 and slid along axial direction A until central spoke portions 114 are positioned near the center C/L (FIG. 8), more or less, of hub 300 along axial direction A. As depicted in FIG. 5, such results in each groove 318 having the radially inner end $114_E$ of a central spoke portion 114 inserted, with the central spoke portions 114 uniformly spaced apart from each other along circumferential direction C. However, radially inner ends $112_E$ and $116_E$ of outer spoke portions 112 and 116 remain outside of grooves 318 at this point.

Figure 9:
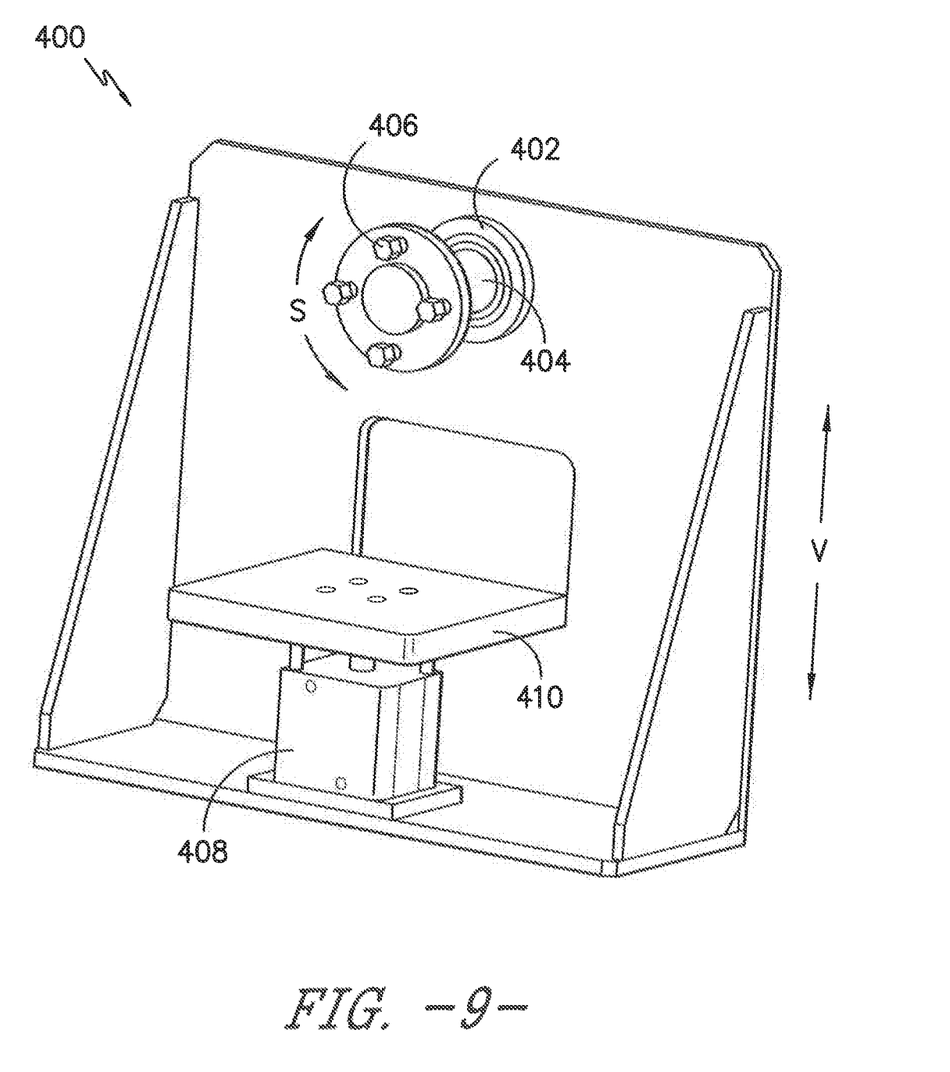
FIG. 9 is a perspective view of an exemplary apparatus as may be used to perform one or more steps of exemplary methods of the present invention.

In order to install radially inner ends 112E and 116E of outer spoke portions 112 and 116, it is necessary to deform annular shear band 104 so as to decrease the distance along radial direction R between shear band 104 and hub 300. FIG. 9 provides an exemplary apparatus for deforming shear band 104. As shown, apparatus 400 includes a bearing 402 supporting a rotatable spindle 404 (arrows S depict rotation). A plurality of fasteners 406 can be inserted through openings 310 of central portion 302 to secure hub 300 (with tire 102) to spindle 404.

Figure 10:
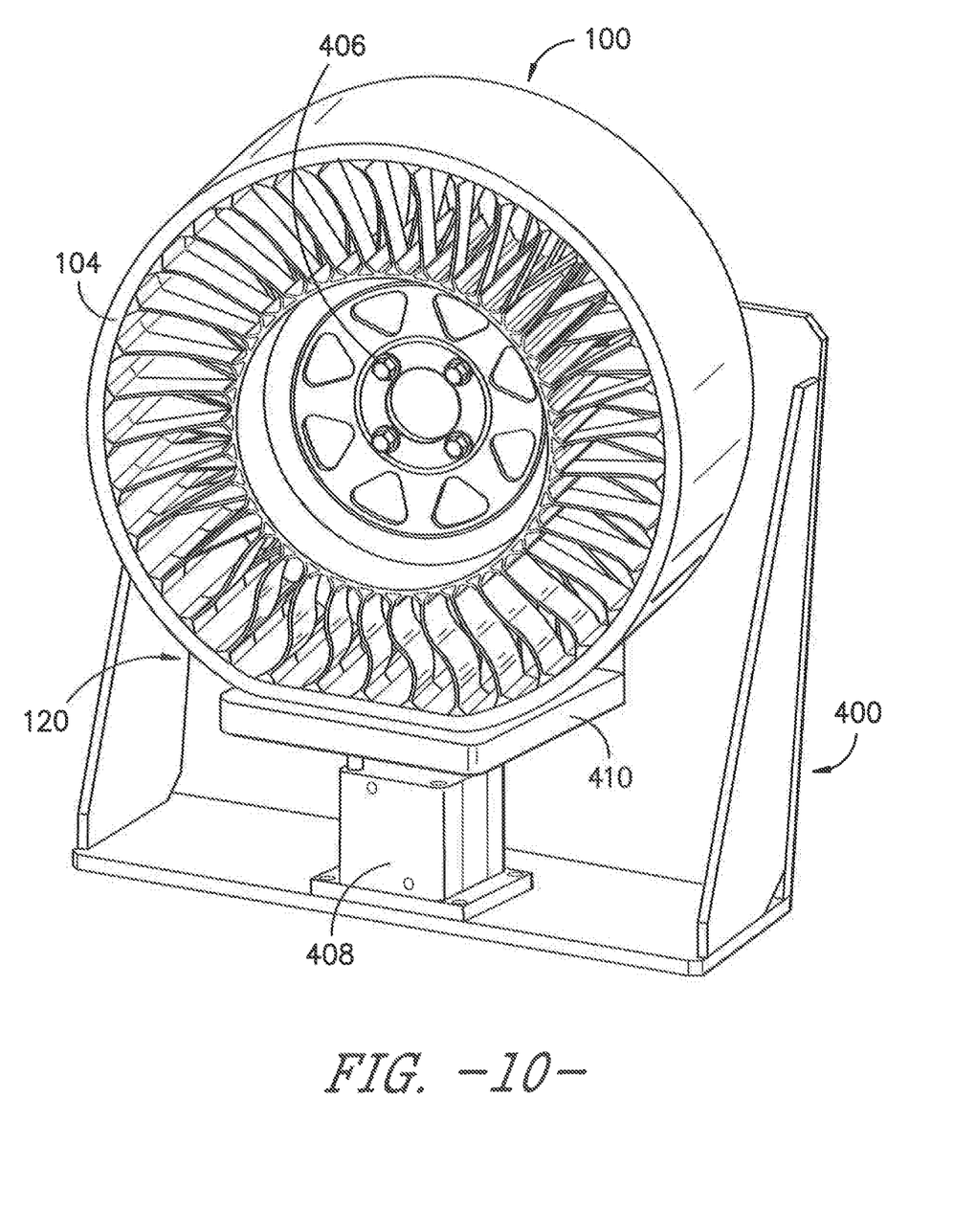
FIG. 10 is a perspective view of the non-pneumatic wheel of FIGS. 1 and 2 positioned on the apparatus of FIG. 9 as part of an exemplary method of the present invention.

Apparatus 400 includes e.g., a pneumatic or hydraulic cylinder 408 onto which a table or support surface 410 is secured. Cylinder 408 can be selectively extended up and down along vertical direction V in desired increments. FIG. 10 shows wheel 100 mounted onto spindle 404. A bottom portion 120 of annular shear band 104 is deformed by extending cylinder 408 so as to press support surface 410 against shear band 104 and decrease the distance along radial direction R between annular band 104 and hub 300. The amount of deformation of shear band 104 is determined by the amount of selective extension of cylinder 408.

Figure 11:
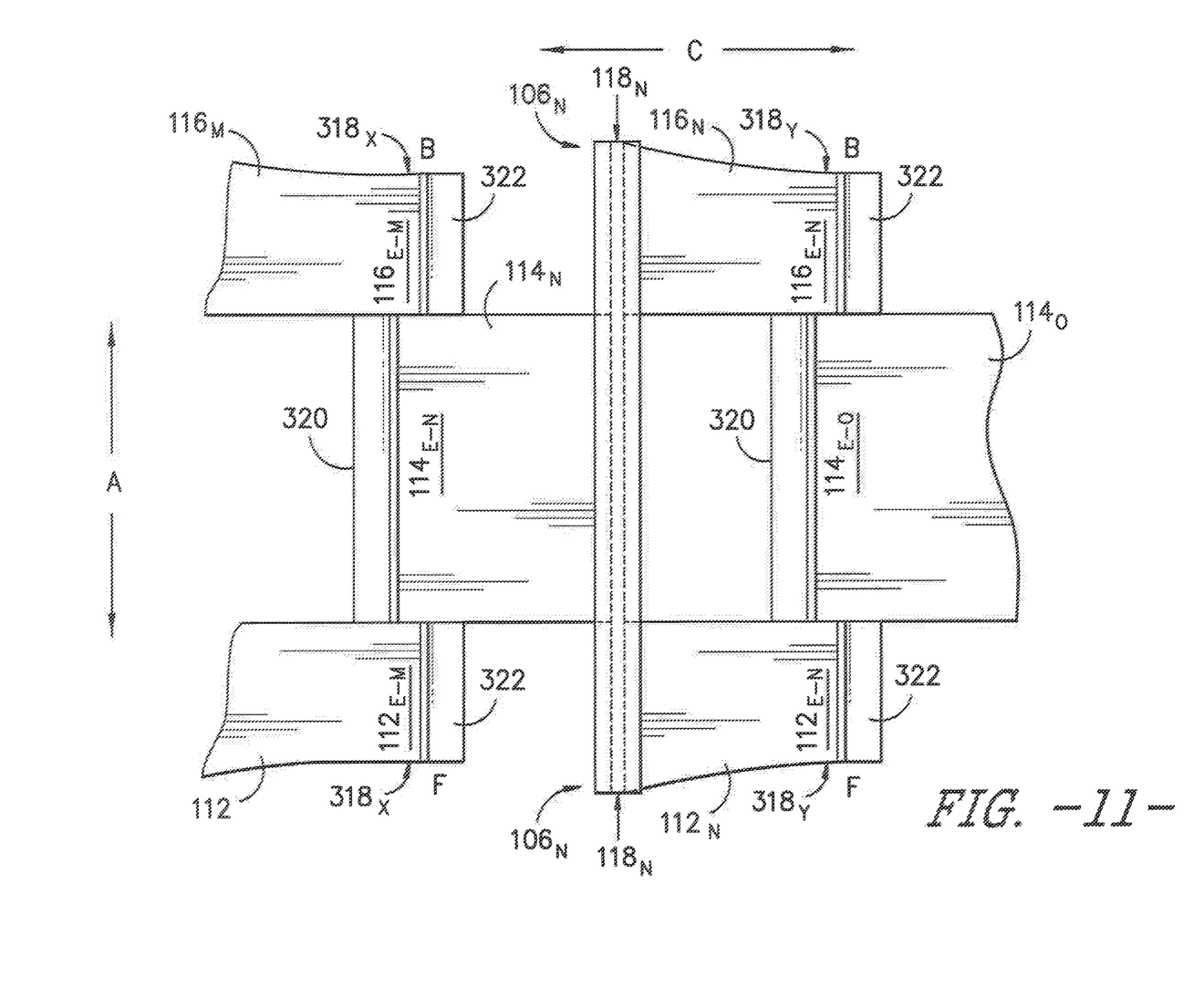
FIG. 11 is a view of exemplary circumferentially adjacent grooves of the present invention as viewed along a radially inward direction depicted by lines 11-11 in FIG. 1.

Next, for at least one central spoke portion 114 of a spoke 106, its corresponding radially-inner ends $112_E$ and $116_E$ of its outer spoken portions 112 and 116 are inserted or slid into one of the grooves 318 that is circumferentially adjacent to the groove 318 containing the radially-inner end 114 of the at least one central spoke portion. This process is repeated for each central spoke portion. The resulting sequence is illustrated in FIG. 11 between two grooves depicted as $318_X$ and $318_Y$, which are circumferentially adjacent to each other along annular receiver 304. As shown, for a given spoke designated as $106_N$, the radially-inner end $114_{E-N}$ of its central spoke portion $114_N$ is inserted or slid into groove $318_X$. For the same spoke $106_N$, the radially-inner ends $112_{E-N}$ and $116_{E-N}$ of its outer spoke portions $112_N$ and $114_N$ are inserted or slid into groove $318_Y$. Outer spoke portions $112_M$ and $116_M$ of yet another spoke $106_M$ are connected with groove $318_X$ while the central portion 1140 of still another spoke $106_O$ is connected with groove $318_Y$.

Figure 12:
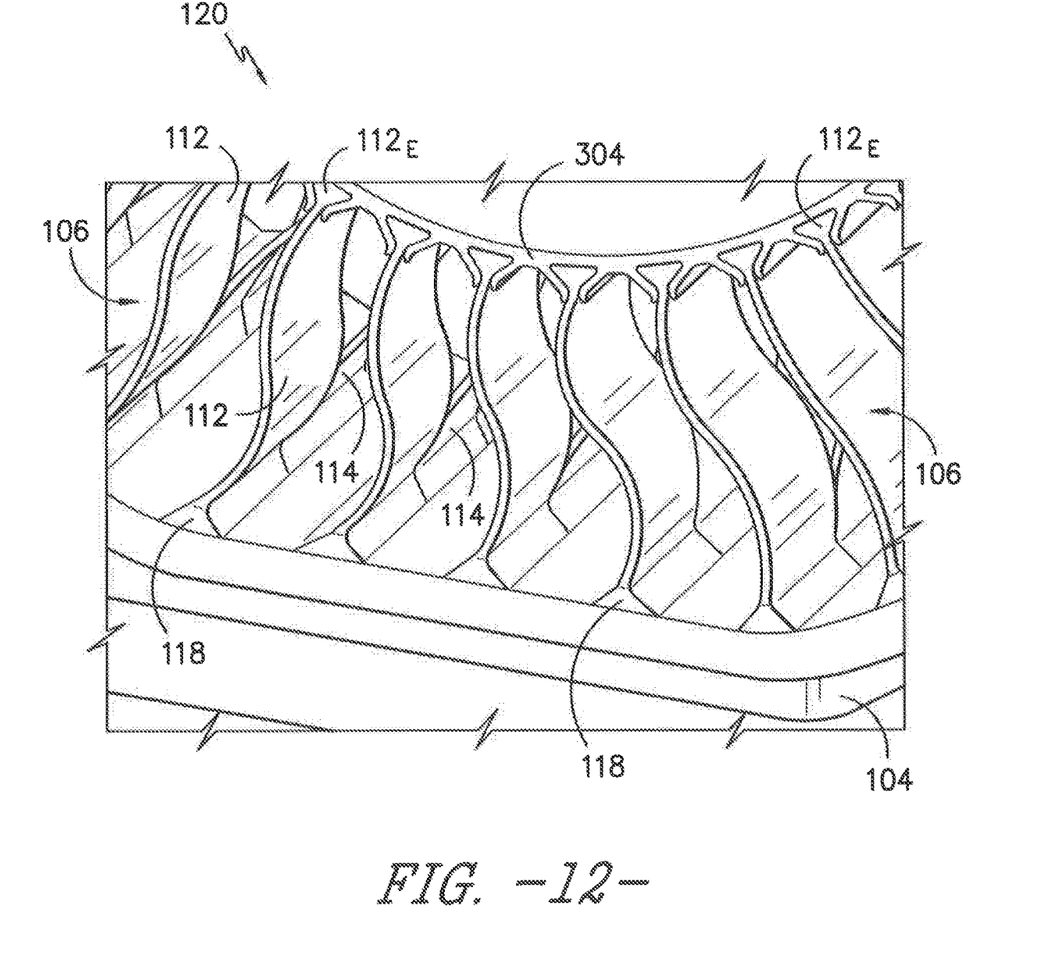
FIG. 12 is a close-up of view of a portion of the non-pneumatic wheel depicted in FIG. 10.

While shear band 104 remains deformed, the radially-inner ends 112E and 116E of outer portions 112 and 116 of multiple spokes 106 can be inserted into grooves 318. For example, depending e.g., the relative diameters of wheel 100 and hub 300 as well as the amount of extension of cylinder 408, the radially-inner ends 112E and 116E of outer portions 112 and 116 of two, three, or more spokes 106 can be inserted into grooves 318 for a given compression of shear band 104. FIG. 12 illustrates a bottom portion 120 of deformed shear band 104 with multiple spokes 106 connected to hub 300.

After the radially-inner ends of the desired number of spokes 106 have been connected with grooves 318, shear band 104 is undeformed by increasing the distance along radial direction R between the annular shear band 104 and the hub 300. Such is accomplished by withdrawing cylinder 408 to move table 410 away from spindle 404. The resulting undeformation of shear band 104 allows spokes 106 that were deformed as shown in FIG. 12 to straighten and return to their normal shape as shown in FIG. 1.

Next, non-pneumatic wheel 100 (including tire 102 and hub 300 on spindle 404) can be rotated along circumferential direction C so as to properly position spokes 106 having outer portions 112 and 116 not yet connected to hub 300. Such rotation would preferably be in an amount that places the not fully connected spokes 106 between table 410 and the axis of rotation of wheel 100 on spindle 404. For example, in one exemplary aspect, such rotation would be in the range of about 20 degrees to 30 degrees (as determined by e.g., an arbitrary radius on wheel 100 rotating by the amount of such angle).

Now, shear band 104 can be deformed again using apparatus 100 as previously described. And, as also previously described, outer portions 112 and 116 of one or more additional spokes 106 can be connected with hub 300 by insertion of radially-inner ends 112E and 116E into grooves 318. The process of deforming shear band 104, inserting or sliding additional radially-inner ends 112E and 116E into grooves 318, undeforming annular band 104, and rotating tire 102 can be repeated until all spokes 106 with portions 112, 114, and 116 are fully connected to hub 300.

The present invention is not limited to apparatus 400 and other devices with e.g., different motors or solenoids may be used to deform annular band 104. By way of additional example, cylinder 408 could be installed to extend along a horizontal direction towards spindle 404. In addition, apparatus 400 could be configured to simultaneously deform annular band 102 at more than one location to increase the number of radially-inner ends 112E and 116E that can be inserted into grooves 318 during deformation of annular shear band 104. For example, one or more additional cylinders and support surfaces could be positioned at different locations around spindle 404 to simultaneously deform annular shear band 104 from multiple sides. In still another alternative, spindle 404 could be enclosed along multiple sides and configured so that the extension of cylinder 408 and extension of surface 410 presses wheel 100 against surface 410 and one or more additional surfaces. Other configurations may be used as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for mounting a non-pneumatic tire onto a hub; the non-pneumatic tire defining axial, radial, and circumferential directions; the non-pneumatic tire having an annular shear band and a plurality of spokes, each spoke having a central spoke portion positioned along the axial direction between a pair of corresponding outer spoke portions, each central spoke portion and outer spoke portions having a radially-outer end connected with the annular shear band, each central spoke portion and outer spoke portions having a radially-inner end; the hub having a plurality of grooves spaced apart along the circumferential direction with each groove having a longitudinal axis extending along the axial direction; the method for mounting comprising:
   placing the hub into a central opening defined by the non-pneumatic tire;
   inserting the radially-inner ends of the central spoke portions into the grooves of the hub with one central spoke portion per groove;
   deforming the annular shear band radially-inward towards the hub so as to decrease a distance along the radial direction between the annular shear band and the hub;
   sliding the radially-inner ends of the corresponding outer spoke portions of at least one central spoke portion into one of the grooves circumferentially adjacent to a groove containing the radially-inner end of the at least one central spoke portion;
   undeforming the annular shear band so as to increase the distance along the radial direction between the annular shear band and the hub;
   rotating the tire and hub a predetermined amount; and
   repeating the deforming, sliding, undeforming, and rotating until all of the outer spoke portions are connected to the hub.

2. The method for mounting a non-pneumatic tire onto a hub as in claim 1, wherein the annular shear band comprises multiple reinforcing bands.

3. The method for mounting a non-pneumatic tire onto a hub as in claim 1, wherein the rotating comprises rotating the tire and hub by an amount in the range of 20 degrees to 30 degrees.

4. The method for mounting a non-pneumatic tire onto a hub as in claim 1, wherein the at least one central portion forms an angle in the range of 8 degrees to 12 degrees with the corresponding outer spoke portions after the sliding of the radially-inner ends of the corresponding outer spoke portions.

5. The method for mounting a non-pneumatic tire onto a hub as in claim 1, wherein the at least one central portion forms an angle of 10 degrees with the corresponding outerspoke portions after the sliding of the radially-inner ends of the corresponding outer spoke portions.

6. The method for mounting a non-pneumatic tire onto a hub as in claim 1, wherein the radially-outer ends of each central spoke portion is connected with the radially-outer ends of the corresponding outer spoke portions.

7. The method for mounting a non-pneumatic tire onto a hub as in claim 2, wherein the annular shear band comprises a shear layer.

8. The method for mounting a non-pneumatic tire onto a hub as in claim 2, further comprising welding an annular receiver to the hub and annular receiver to each other.

9. The method for mounting a non-pneumatic tire onto a hub as in claim 2, wherein the plurality of spokes comprises inextensible reinforcements.

10. The method for mounting a non-pneumatic tire onto a hub as in claim 2, wherein the central spoke portion and outer spoke portions of each spoke are joined together along the radially-outer end of each spoke.

11. The method for mounting a non-pneumatic tire onto a hub as in claim 1, wherein each of the grooves has a cross-sectional shape configured for complementary receipt of the radially-inner ends.

12. The method for mounting a non-pneumatic tire onto a hub as in claim 1, further comprising mounting the hub onto a support before the deforming.

13. The method for mounting a non-pneumatic tire onto a hub as in claim 12, wherein the deforming comprises placing the tire onto a surface and moving the surface towards the hub.

14. The method for mounting a non-pneumatic tire onto a hub as in claim 13, wherein the undeforming comprises moving the surface away from the hub.

15. The method for mounting a non-pneumatic tire onto a hub as in claim 14, wherein moving the surface comprises extending or contracting a cylinder.

* * * * *